United States Patent [19]
Beebe et al.

[11] Patent Number: 6,101,544
[45] Date of Patent: Aug. 8, 2000

[54] METHOD AND SYSTEM FOR SHARING A SINGLE UNIVERSAL ASYNCHRONOUS RECEIVER TRANSMITTER (UART) AMONG MULTIPLE RESOURCES IN A DATA PROCESSING SYSTEM

[75] Inventors: William Eldred Beebe, Round Rock; John C. Kennel, Austin; Michael Y. Lim, Leander; Chet Mehta, Austin; Maulin I. Patel, Round Rock, all of Tex.

[73] Assignee: International Business Machines Corporation, Armonk, N.Y.

[21] Appl. No.: 09/046,837

[22] Filed: Mar. 24, 1998

[51] Int. Cl.[7] .............................. G06F 13/38; G06F 15/17
[52] U.S. Cl. ........................ 709/229; 370/110; 711/162
[58] Field of Search .................................. 395/667, 250, 395/884; 364/200; 370/110; 711/162

[56] References Cited

U.S. PATENT DOCUMENTS

| | | | |
|---|---|---|---|
| 4,709,329 | 11/1987 | Hecker | 364/200 |
| 5,463,629 | 10/1995 | Ko | 370/110 |
| 5,694,603 | 12/1997 | Reiffin | 395/667 |
| 5,717,870 | 2/1998 | Dobson | 395/250 |
| 5,790,895 | 8/1998 | Krontz et al. | 395/884 |
| 5,890,219 | 3/1999 | Scaringella et al. | 711/162 |

*Primary Examiner*—Frank J. Asta
*Assistant Examiner*—Farzaneh Farahi
*Attorney, Agent, or Firm*—Volel Emile; Felsman, Bradley, Vaden, Gunter & Dillon, LLP

[57] ABSTRACT

A data processing system and method for sharing a component of the data processing system between multiple resources are disclosed. According to the method, at least one query is transmitted from a first resource to a second resource. In response to receipt of the query by the second resource, a reply is transmitted from the second resource to the first resource. The reply indicates that the second resource has an active communication session through a particular communication port controlled by the shared component. In response to receipt of the reply by the first resource, a transfer command is transmitted from the first resource to the second resource. In response to receipt of the transfer command by the second resource, control of the component is transferred from the second resource to the first resource while maintaining the active communication session. In one embodiment, the first and second resources are software resources, and the shared component is a universal asynchronous receiver transmitter (UART) that drives a serial communication port.

25 Claims, 4 Drawing Sheets

METHOD AND SYSTEM FOR SHARING A SINGLE UNIVERSAL ASYNCHRONOUS RECEIVER TRANSMITTER (UART) AMONG MULTIPLE RESOURCES IN A DATA PROCESSING SYSTEM

BACKGROUND OF THE INVENTION

1. Technical Field

The present invention relates in general to data processing and, in particular, to a data processing system and method for sharing a component of a data processing system between multiple resources. Still more particularly, the present invention relates to a method and system for sharing a single universal asynchronous receiver transmitter (UART) between multiple resources in a data processing system.

2. Description of the Related Art

In order to produce smaller, more power efficient, and lower cost computer systems, it is often desirable to reduce the number of components utilized in computer systems. However, a reduction in the number of components within a data processing system often introduces undesirable complexity into a data processing system design.

It would therefore be desirable to provide a data processing system in which the number of components within the data processing system are reduced while introducing a minimal amount of complexity.

SUMMARY OF THE INVENTION

The present invention includes a recognition that the number of components in a data processing system can be reduced while maintaining full functionality by identifying components that are duplicated in the data processing system, eliminating one or more of the duplicate components, and sharing at least one of the remaining components between multiple resources. Among the components that are typically duplicated in a data processing system and can therefore be shared between multiple resources are the universal asynchronous receiver transmitters (UARTs) that drive serial communication ports.

It is therefore one object of the present invention to provide an improved data processing system.

It is another object of the present invention to provide a data processing system and method for sharing components between multiple resources in a data processing system.

It is yet another object of the present invention to provide a method and system for sharing a single universal asynchronous receiver transmitter (UART) among multiple resources in a data processing system.

The foregoing objects are achieved as is now described. According to the method of the present invention, at least one query is transmitted from a first resource to a second resource. In response to receipt of the query by the second resource, a reply is transmitted from the second resource to the first resource. The reply indicates that the second resource has an active communication session through a particular communication port controlled by the shared component. In response to receipt of the reply by the first resource, a transfer command is transmitted from the first resource to the second resource. In response to receipt of the transfer command by the second resource, control of the component is transferred from the second resource to the first resource while maintaining the active communication session.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
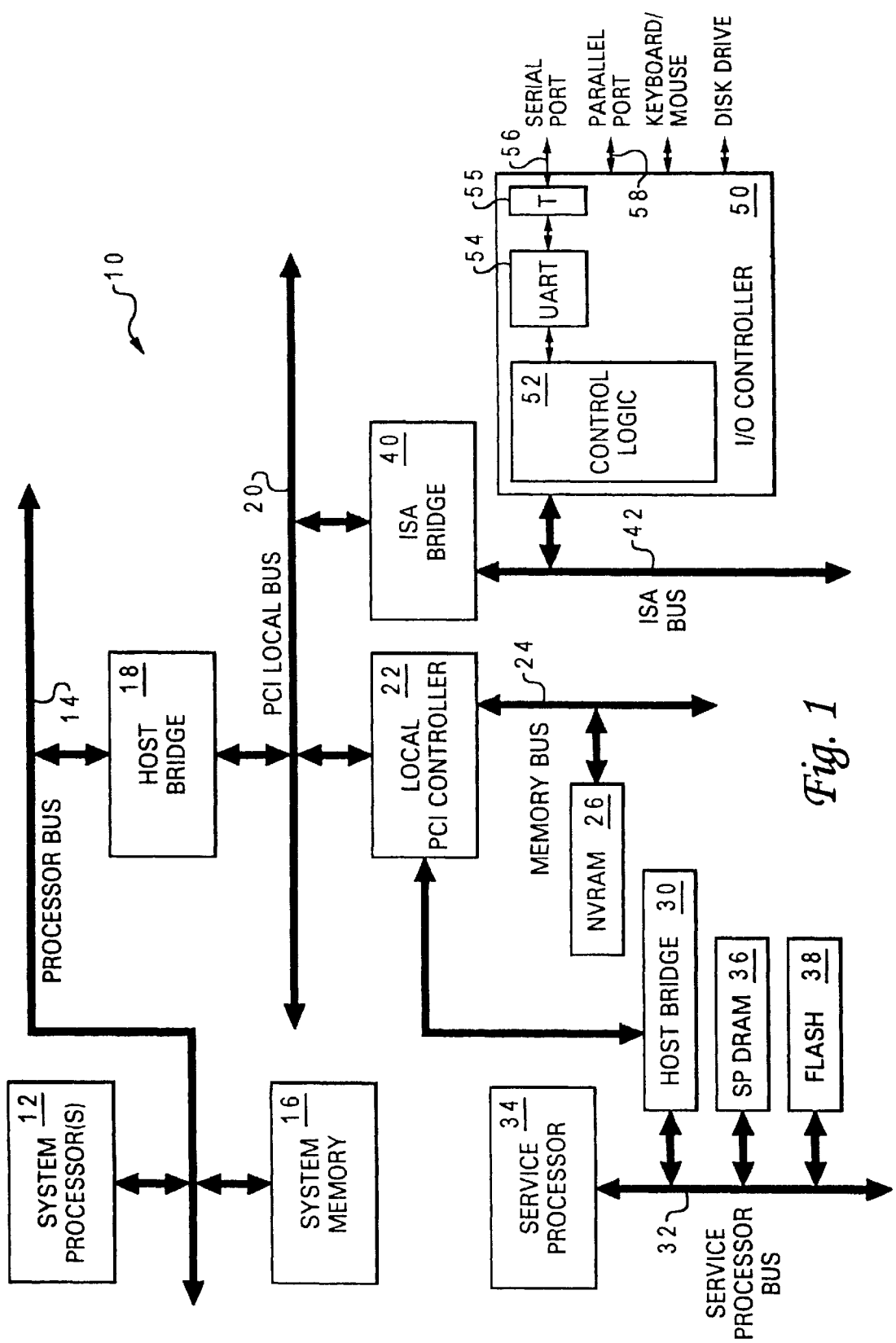
FIG. 1 depicts an illustrative embodiment of a data processing system with which the method and system of the present invention may advantageously be utilized.

With reference now to the figures and in particular with reference to FIG. 1, there is depicted a block diagram of an illustrative embodiment of a data processing system with which the present invention may advantageously be utilized. The illustrative embodiment depicted in FIG. 1 is a workstation or server computer system such as the RS/6000® manufactured by International Business Machines Corporation (IBM) of Armonk, N.Y.; however, as will become apparent from the following description, the present invention is also applicable to any other data processing system.

As illustrated in FIG. 1, data processing system 10 includes at least one system processor 12, which is coupled to processor bus 14. System processor 12, which may comprise one of the PowerPC™ line of processors produced by IBM, is a general-purpose processor that processes data under the control of operating system and application software stored in system memory 16. System processor 12 is coupled via processor bus 14 and host bridge 18 to Peripheral Component Interconnect (PCI) local bus 20.

Communication on PCI local bus 20 is governed by local PCI controller 22, which is in turn coupled to non-volatile random access memory (NVRAM) 26 via memory bus 24. Local PCI controller 22 is further coupled via a second host bridge 30 and service processor bus 32 to service processor 34. Service processor 34 is a dedicated special-purpose processor that serves as a full time hardware and software system monitor during the operation of data processing system 10. The functionality of service processor 34 is governed by system monitoring software stored in service processor dynamic random access memory (SP DRAM) 36. At startup, service processor 34 boots from code in flash memory 38. Flash memory 38 also stores system firmware that is executed by system processor 12 at startup prior to the loading of the operating system.

Data processing system 10 further includes Industry Standard Architecture (ISA) bus 42, which is coupled to PCI local bus 20 by ISA bridge 40. Coupled to ISA bus 42 is an input/output (I/O) controller 50, which controls communication between data processing system 10 and attached peripheral devices such as a keyboard, mouse, and disk drive. In addition, I/O controller 50 supports external communication by data processing system 10 via a serial port 56 and a parallel port 58.

Figure 2:
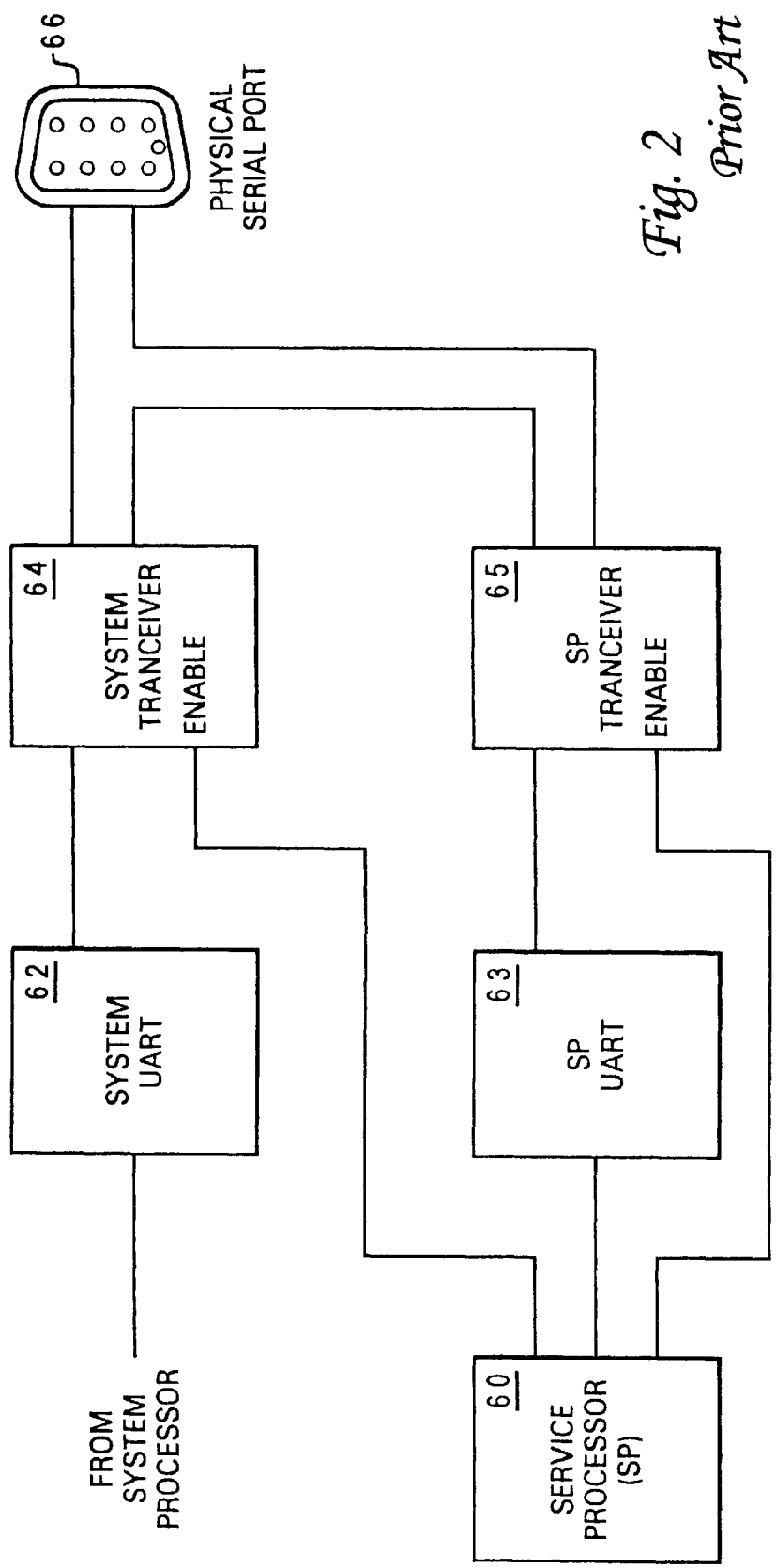
FIG. 2 illustrates a block diagram of a conventional serial port and associated hardware.

Referring now to FIG. 2, there is illustrated a block diagram of a serial port and associated circuitry of a conventional data processing system including a system processor and service processor. The system processor (not illustrated) has a dedicated system universal asynchronous receiver transmitter (UART) 62, and service processor 60 has a dedicated service processor (SP) UART 63. UARTs 62 and 63 convert data to be transmitted via serial port 66 from parallel format into serial format and convert data received from serial port 66 from serial format into parallel format. System UART 62 is coupled to system transceiver 64, and SP UART 63 is coupled to SP transceiver 65. Transceivers 64 and 65 adjust the voltage levels of signals transmitted and received via serial port 66 to comply with the voltage specifications of the data processing system and the selected serial communication protocol (e.g., RS-232).

As shown in FIG. 2, each of transceivers 64 and 65 has an enable input coupled to service processor 60. By asserting and deasserting the enable inputs of transceivers 64 and 65, service processor 60 determines which of service processor 60 and the system processor is able to transmit and receive data via serial port 66. In summary, FIG. 2 illustrates conventional serial port circuitry, which includes duplicate components (i.e., UARTs and transceivers) and is controlled by a single resource (i.e., service processor 60).

In order to avoid the disadvantages of the conventional serial port circuitry depicted in FIG. 2 (e.g., larger size, higher cost, and greater power consumption), data processing system 10 advantageously reduces the number of components within the serial port circuitry of I/O controller 50. As shown in FIG. 1, serial port 56, which is shared by system processor 12 and service processor 34, is driven by a single UART 54 rather than by dual UARTs as shown in FIG. 2. UART 54 converts data received from control logic 52 from parallel format into serial format for communication via serial port 56 and converts data received from serial port 56 from serial format into parallel format prior to passing the received data to control logic 52. Transceiver 55 adjusts the voltage levels of in-coming and out-going signals to comply with the voltage specifications of data processing system 10 and the selected serial communication protocol (e.g., RS-232). Of course, depending upon design considerations, I/O controller 50 may include additional serial ports, each having a single associated UART and transceiver.

Figure 3:
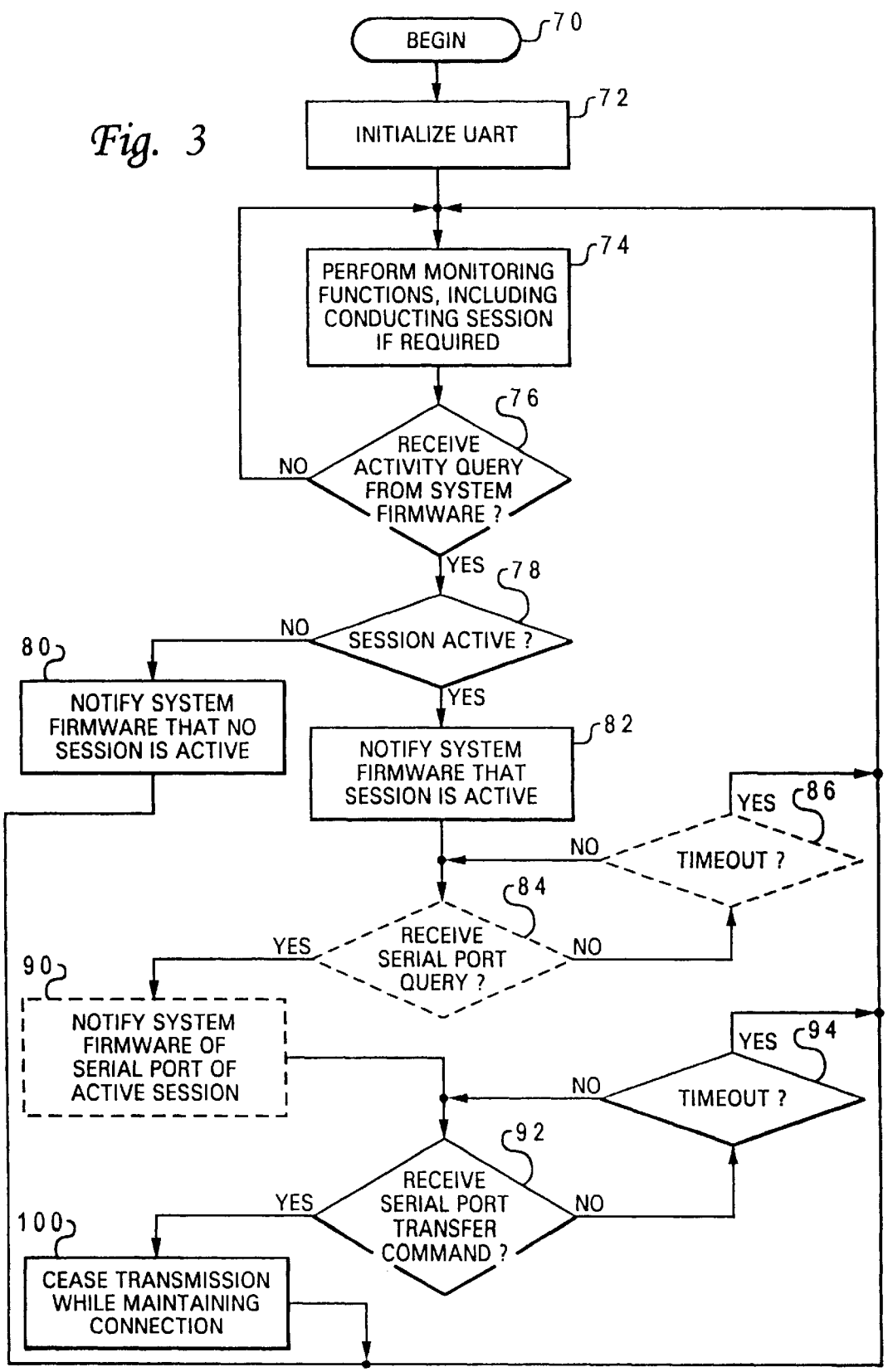
FIG. 3 is a logical flowchart of an exemplary method of operating the service processor of FIG. 1 such that the service processor shares a single universal asynchronous receiver transmitter (UART) with the system processor.
Figure 4:
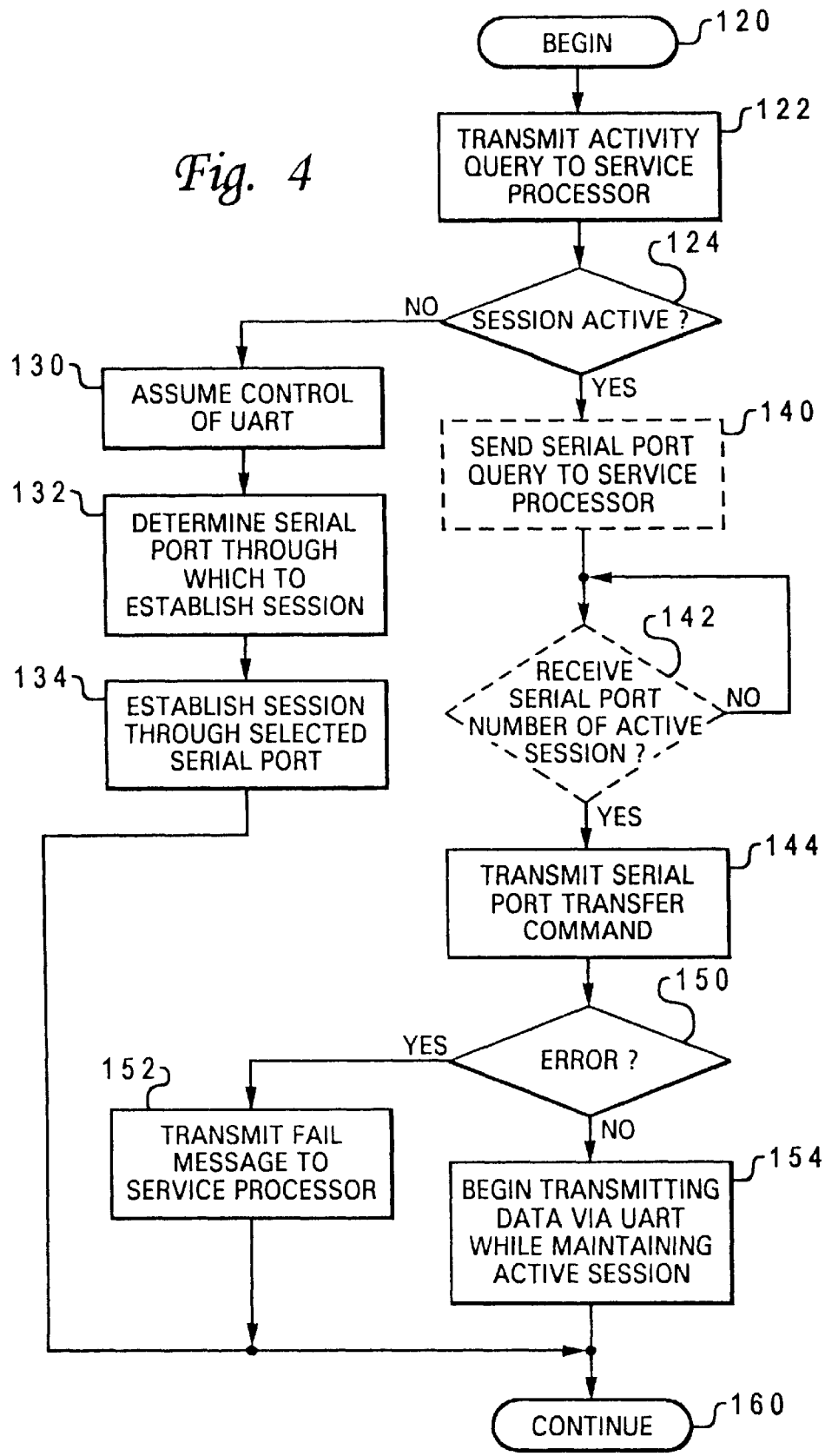
FIG. 4 is a logical flowchart of an exemplary method of operating the system processor of FIG. 1 such that the system processor shares a single UART with the service processor.

In a preferred embodiment, arbitration between multiple software resources that may access UART 54, for example, the system firmware executed by system processor 12 and the system monitoring software executed by service processor 34, is governed by the arbitration methodology illustrated in FIGS. 3 and 4. Referring first to FIG. 3, which illustrates a logical flowchart of a method of operating service processor 34, the process begins at block 70 and thereafter proceeds to block 72, which depicts service processor 34 initializing UART 54 by setting the internal buffers and logic circuitry of control logic 52 and UART 54 to a known state. The initialization depicted at block 72 is typically performed at power on. Then, as depicted at block 74, service processor 34 performs various monitoring functions specified by the system monitoring program stored in SP DRAM 36. As indicated at block 74, the system monitoring functions supported by the software executed by service processor 34 preferably include conducting communication sessions via serial port 56. Such communication sessions can be initiated either by an external device, for example, a modem, through a menu interface provided by service processor 34 or by service processor 34 itself in response to detection of selected hardware and software faults. For example, in response to important faults, the system monitoring software executed by service processor 34 may initiate a communication session in order to page or dial a system operator or service facility with a fault number. As shown at block 76 of FIG. 3, as long as service processor 34 does not receive an activity query from the system firmware executed by system processor 12, service processor 34 continues the perform the monitoring and communication functions shown at block 74.

Referring now to FIG. 4, which depicts the operation of the system firmware executed by system processor 12, following the loading of the system firmware at block 120, the system firmware may desire to initiate serial communication via serial port 56. If so, the system firmware executed by system processor 12 transmits an activity query to service processor 34 to ascertain whether or not service processor 34 has an active serial port communication session, as illustrated at block 122. The communication between the system firmware and service processor 34 illustrated in FIGS. 3 and 4 may be conducted utilizing any of a number of well known inter-process communication techniques, including interrupt communication or mail box communication within a mutually shared address space.

Returning to FIG. 3, in response to a determination at block 76 that an activity query has been received by service processor 34 from the system firmware, the process proceeds to block 78. Block 78 depicts a determination by service processor 34 whether it is currently conducting a communication session via serial port 56. If not, the process shown in FIG. 3 passes to block 80, which illustrates service processor 34 notifying the system firmware that no communication session via UART 54 is currently active. Thereafter, the process illustrated in FIG. 3 returns to block 74.

Referring now to block 124 of FIG. 4, in response to receipt of the reply from service processor 34, a determination is made whether the reply indicates that service processor 34 has an active communication session. In response to a determination that the reply indicates that no communication session is currently active, the process illustrated in FIG. 4 passes to block 130, which depicts the system firmware assuming control of UART 54. Next, as illustrated at block 132, the system firmware selects a serial port (if data processing system includes more than one) through which communication will be established. Thereafter, communication is established through the selected serial port, as shown at block 134, and processing continues at block 160.

Returning to FIG. 3, in response to a determination at block 78 that a communication session is active, the process proceeds to block 82, which depicts service processor 34 transmitting a reply to the system firmware indicating that it has an active communication session via UART 54 and serial port 56. As shown at blocks 124 and 140 of FIG. 4, in response to receipt of a reply indicating that a communication session is currently active, the system firmware transmits a serial port query to service processor 34 to ascertain which serial port is being utilized, if data processing system 10 includes more than one serial port. If data processing system includes only a single serial port, the process passes directly to block 144.

Referring again to FIG. 3, in embodiments in which data processing system 10 includes only a single serial port, the process passes directly from block 82 to block 92. However, in embodiments in which data processing system 10 includes multiple serial ports, service processor 34 iterates at block 84 waiting to receive the serial port query from the system firmware. If no serial port query is received at block 84, the process proceeds to block 86, which illustrates a determination of whether or not a timeout period has elapsed. If so, the process returns to block 74, which has been described. However, if the timeout period has not yet elapsed, the process returns from block 86 to block 84. Then, in response to receiving the serial port query from the system firmware, the process passes from block 84 to block 90, which depicts service processor 34 transmitting an indication of which serial port is being utilized for the currently active communication session.

The process proceeds from either block 82 or block 90 to block 92, which depicts service processor 34 awaiting a serial port transfer command from the system firmware. If no serial port transfer command is received, the process proceeds to block 94, which illustrates a determination of whether or not a timeout period has elapsed. If so, the process passes to block 74, which has been described. However, in response to a determination that the timeout period has not elapsed, the process simply returns from block 94 to block 92.

Referring again to FIG. 4, in embodiments of data processing system 10 including multiple serial ports, the system firmware iterates at block 142 until the system firmware receives a notification of the currently active serial port from service processor 34. Then, the process passes to block 144, which depicts the system firmware transmitting a serial port transfer command to service processor 34. As shown at block 100 of FIG. 3, service processor 34 discontinues transmitting data via the active serial port in response to receipt of the serial port transfer command. Importantly, however, service processor 34 maintains the serial port connection during handoff of the control of UART 54. Referring again to FIG. 4, a determination is then made at block 150 whether or not an error of some type will prevent the system firmware from successfully exercising control over UART 54. If so, the system firmware transmits a fail message to service processor 34, as illustrated at block 152. This fail message is handled by the system monitoring software executed by service processor 34 and may initiate another communication session as described above with respect to block 74 of FIG. 3. Alternatively, in response to a determination that no error will prevent system processor 12 from assuming control of UART 54, the process depicted in FIG. 4 proceeds from block 150 to block 154, which illustrates the system firmware maintaining the active communication session and beginning to transmit data via UART 54 and the active serial port. Thereafter, processing continues at block 160.

As has been described, the present invention provides a method of sharing a component of a data processing system between multiple resources. By permitting a single component, such as a UART, to be shared by multiple software resources, the size, expense, and power consumption of a subsystem of the data processing system is advantageously reduced. The present invention also advantageously permits an active communication session to be maintained during arbitration for control of the shared component and during the transfer of control of the shared component. This feature is advantageous, for example, when the communication session established by the service processor transmits operator panel progress data to a remote console. Because the active communication session is maintained during transfer of control of the shared component from the service processor to the system firmware, a remote human operator will be presented with a continuous progress indication and will therefore be able to determine whether an error has occurred during data processing system startup.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to specific "method steps" implementable by a computer system, those skilled in the art will appreciate from the foregoing description that the present invention may also be embodied as a computer program product for use with a computer system. Those skilled in the art should readily appreciate that programs defining the functions of the present invention can be delivered to a computer via a variety of electronic-usable media, which include without limitation: (a) information permanently stored on non-writable storage media (e.g., CD-ROM); (b) information alterably stored on writable storage media (floppy diskettes or hard disk drives); and (c) information conveyed to a computer through a communication medium, such as a computer or telephone network.

What is claimed is:

1. A method for sharing a component of a data processing system between a first software resource and a second software resource, said method comprising:

transmitting at least one query from said first software resource to said second software resource;

in response to receipt of said at least one query by said second software resource, transmitting a reply from said second software resource to said first software resource, said reply indicating that said second software resource has an active communication session through a particular communication port in said data processing system, wherein said particular communication port is controlled by said component;

in response to receipt of said reply by said first software resource, transmitting a transfer command from said first software resource to said second software resource;

in response to receipt of said transfer command by said second software resource, transferring control of said component from said second software resource to said first software resource while maintaining said active communication session; and thereafter, transmitting data from said first software resource via said particular communication port in said active communication session.

2. The method of claim 1, said data processing system including a first physical processor that executes said first software resource and a second physical processor that executes said second software resource, where transmitting said at least one query from said first software resource to said second software resource includes transmitting said at least one query from said first physical processor to said second physical processor.

3. The method of claim 1, wherein said particular communication port is a serial port, and wherein transmitting a reply comprises transmitting a reply from said second software resource to said first software resource that specifies said serial port.

4. The method of claim 1, wherein said component is a universal asynchronous receiver transmitter (UART), and wherein transferring control of said component comprises transferring control of said UART from said second software resource to said first software resource.

5. The method of claim 1, wherein transferring control of said component comprises said second software resource discontinuing transmitting data via said particular communication port.

6. The method of claim 1, and further comprising transmitting an inactive reply to said first software resource in response to receipt of said at least one query by said second software resource while said second software resource does not have an active communication session though a communication port controlled by said component.

7. A data processing system, comprising:
a first software resource and a second software resource;
a component shared by said first software resource and said second software resource;
means for transmitting at least one query from said first software resource to said second software resource;
means, responsive to receipt of said at least one query by said second software resource, for transmitting a reply from said second software resource to said first software resource, said reply indicating that said second software resource has an active communication session through a particular communication port in said data processing system, wherein said particular communication port is controlled by said component;
means, responsive to receipt of said reply by said second software resource, for transmitting a transfer command from said first software resource to said second software resource;
means, responsive to receipt of said transfer command by said second software resource, for transferring control of said component from said second software resource to said first software resource while maintaining said active communication session; and
means for thereafter transmitting data from said first software resource via said particular communication port in said active communication session.

8. The data processing system of claim 7, said data processing system including a first physical processor that executes said first software resource and a second physical processor that executes said second software resource.

9. The data processing system of claim 7, wherein said particular communication port is a serial port.

10. The data processing system of claim 7, wherein said component is a universal asynchronous receiver transmitter (UART).

11. The data processing system of claim 7, wherein said means for transferring control of said component comprises means for discontinuing transmission of data via said particular communication port by said second software resource.

12. The data processing system of claim 7, and further comprising means for transmitting an inactive reply to said first software resource in response to receipt of said at least one query by said second software resource while said second software resource does not have an active communication session though a communication port controlled by said component.

13. A program product that enables a component of a data processing system to be shared, said program product comprising:
an electronic usable medium encoding a first software resource and a second software resource, wherein said first software resource includes:
instructions for causing a computer to transmit at least one query from said first software resource to said second software resource;
instructions for causing a computer to transmit a transfer command from said first software resource to said second software resource in response to receipt of an active reply; and
instructions, responsive to said first software resource receiving control of said component, for transmitting data from said first software resource via said particular communication port in said active communication session;
said second software resource includes:
instructions for causing a computer to transmit an active reply to said first software resource in response to receipt of at least one query, said active reply indicating that said second software resource has an active communication session through a particular communication port in said computer system, wherein said particular communication port is controlled by said component; and
instructions, responsive to receipt of a transfer command, for causing a computer to transfer control of said component from said second software resource to said first software resource while said second software resource maintains said active communication session.

14. The program product of claim 13, wherein said particular communication port is a serial port, and wherein said instructions for causing a computer to transmit an active reply comprise instructions for causing a computer to transmit a reply specifying said serial port.

15. The program product of claim 13, wherein said component is a universal asynchronous receiver transmitter (UART), and wherein said instructions for causing a computer to transfer control of said component comprise instructions for causing a computer to transfer control of said UART from said second software resource to said first software resource.

16. The program product of claim 13, wherein said instructions for causing a computer to transfer control of said component comprise instructions for causing a computer to discontinue allowing said second software resource to transmit data via said particular communication port.

17. The program product of claim 13, said second software resource further comprising instructions for causing a computer to transmit an inactive reply from said second software resource to said first software resource in response to receipt of said at least one query while said second software resource does not have an active communication session though a communication port controlled by said component.

18. An apparatus for serial communication, comprising:
a serial communication port that may be utilized by either a first software resource or a second software resource;
a single universal asynchronous receiver transmitter (UART) coupled to said serial communication port;
means for transmitting at least one query from said first software resource to said second software resource;
means, responsive to receipt of said at least one query by said second software resource, for transmitting a reply indicating that said second software resource has an active communication session through said serial communication port;
means, responsive to receipt of said reply by said first software resource, for transmitting a transfer command from said first software resource to said second software resource; and
means, responsive to receipt of the transfer command by said second software resource, for transferring control of said component to said first software resource while maintaining said active communication session.

19. The serial communication apparatus of claim 18, and further comprising a transceiver disposed between said serial communication port and said single UART, wherein said transceiver adjusts voltage levels of signals communicated via said serial communication port.

20. A method for sharing a component of a data processing system between a first resource and a second resource, said method comprising:

while said second resource has control of said component, arbitrating between said first resource and said second resource for control of said component, wherein said component manages a communication port in said data processing system through which said second resource has an active communication session;

in response to said first resource winning said arbitration, transferring control of said component from said second resource to said first resource while maintaining said active communication session; and thereafter, transmitting data from said first resource via said communication port in said active communication session.

21. The method of claim 20, wherein arbitrating comprises arbitrating utilizing communication directly between said first resource and said second resource.

22. A data processing system, comprising:

a first resource and a second resource;

a communication port coupled to said first resource and said second resource;

a component that manages said communication port; and means for arbitrating between said first resource and said second resource for control of said component;

wherein responsive to said means for arbitrating granting control of said component to said first resource while said second resource has an active communication session through said communication port, said second resource transfers control of said component to said first resource while maintaining said active communication session and said first resource thereafter transmits data via said communication port in said active communication session.

23. The data processing system of claim 22, wherein said means for arbitrating comprises means for arbitrating utilizing communication directly between said first resource and said second resource.

24. A program product for sharing a component of a data processing system between a first resource and a second resource, said program product comprising:

a computer usable medium;

instructions within said computer usable medium for causing said data processing system, while said second resource has control of said component, to arbitrate between said first resource and said second resource for control of said component, wherein said component manages a communication port in said data processing system through which said second resource has an active communication session;

instructions within said computer usable medium, responsive to said first resource winning said arbitration, for causing said data processing system to transfer control of said component from said second resource to said first resource while maintaining said active communication session; and instructions within said computer usable medium for causing said data processing system to thereafter transmit data from said first resource via said communication port in said active communication session.

25. The program product of claim 24, wherein said instructions for causing said data processing system to arbitrate comprises instructions for causing said data processing system to arbitrate utilizing communication directly between said first resource and said second resource.

* * * * *